United States Patent
Kilroy et al.

(10) Patent No.: US 7,626,797 B2
(45) Date of Patent: Dec. 1, 2009

(54) SOLID STATE POWER CONTROLLER WITH LIGHTNING PROTECTION

(75) Inventors: Donald G. Kilroy, Rockford, IL (US); Nicholas J. Robertson, Rockford, IL (US); Josef Maier, Munningen (DE); Bernd Löfflad, Nördlingen-Löpsingen (DE)

(73) Assignee: Hamilton Sundstrand Corporation, Rockford, IL (US)

( * ) Notice: Subject to any disclaimer, the term of this patent is extended or adjusted under 35 U.S.C. 154(b) by 223 days.

(21) Appl. No.: 11/491,803

(22) Filed: Jul. 24, 2006

(65) Prior Publication Data

US 2008/0019070 A1    Jan. 24, 2008

(51) Int. Cl.
*H02H 3/06* (2006.01)
*H02H 9/02* (2006.01)

(52) U.S. Cl. .................................. 361/93.4

(58) Field of Classification Search ............... 361/93.2, 361/93.4
See application file for complete search history.

(56) References Cited

U.S. PATENT DOCUMENTS

| 4,495,536 | A | * | 1/1985 | Bynum | 361/58 |
|---|---|---|---|---|---|
| 4,593,213 | A | * | 6/1986 | Vesce et al. | 327/310 |
| 4,835,649 | A | * | 5/1989 | Salerno | 361/18 |
| 5,400,206 | A |   | 3/1995 | Barnes et al. | |
| 5,467,242 | A | * | 11/1995 | Kiraly | 361/94 |
| 5,510,943 | A | * | 4/1996 | Fukunaga | 361/18 |
| 5,710,508 | A | * | 1/1998 | Watanabe | 323/284 |
| 6,097,582 | A | * | 8/2000 | John et al. | 361/79 |
| 2007/0177322 | A1 | * | 8/2007 | Jacobs | 361/100 |

* cited by examiner

*Primary Examiner*—Ronald W Leja
(74) *Attorney, Agent, or Firm*—Carlson, Gaskey & Olds PC

(57) ABSTRACT

A method of controlling a solid state power controller includes selectively allowing a transient current through a solid state power control switch in response to the transient current exceeding at least one threshold.

5 Claims, 1 Drawing Sheet

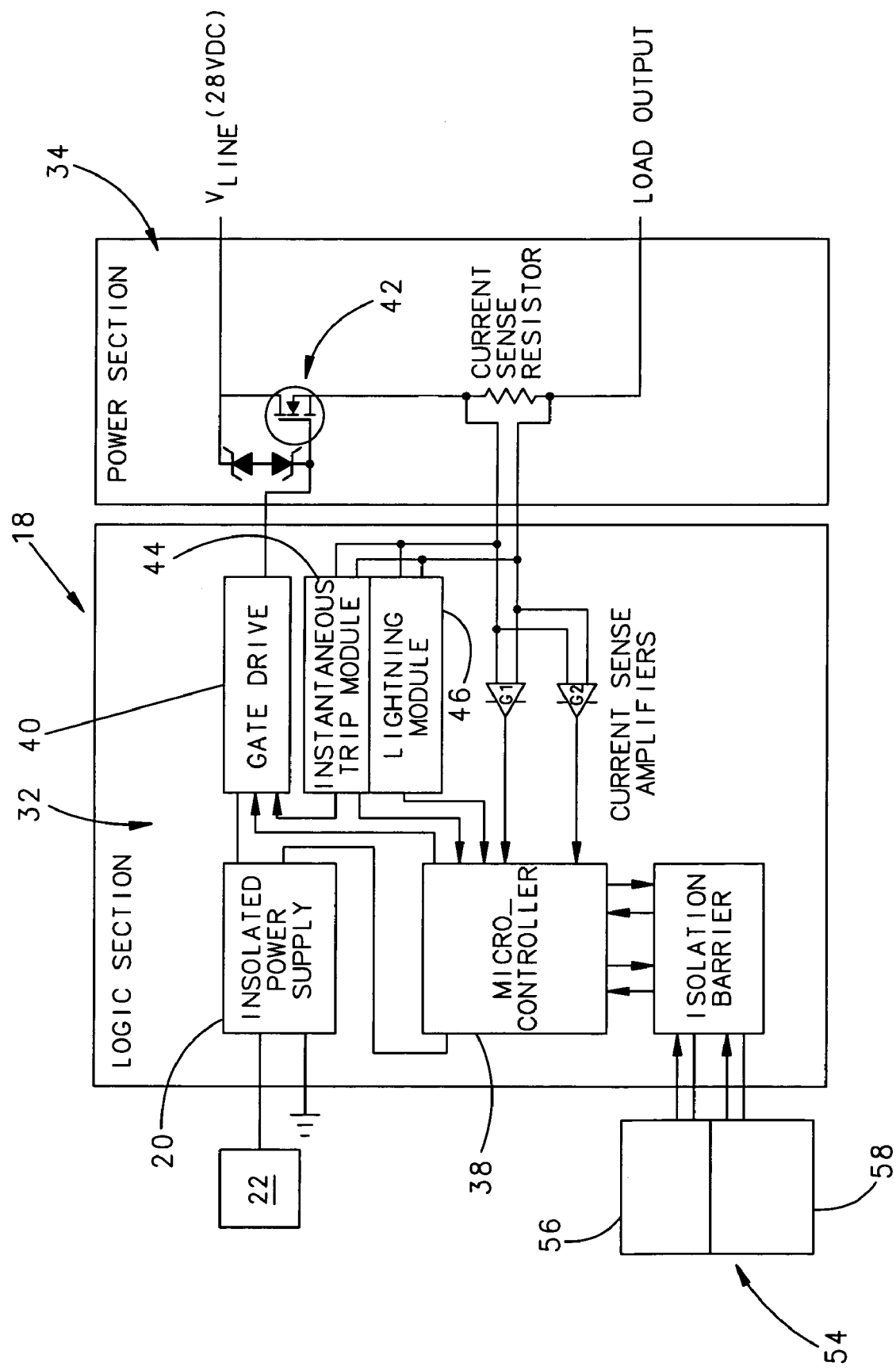

SOLID STATE POWER CONTROLLER WITH LIGHTNING PROTECTION

BACKGROUND OF THE INVENTION

This invention relates to vehicle power systems and, more particularly, to solid state power controls.

Vehicles, such as aircraft, typically utilize one or more power distribution units to distribute power from a primary power source to various vehicle systems. The solid state power controls in a power distribution unit typically include an electronic switch, such as a FET, and electronic circuitry that provides wiring protection. The FET and circuitry are often referred to as a solid state power controller ("SSPC"). The SSPC has found widespread use because of its desirable status capability, reliability, and packaging density. A typical power distribution unit may include hundreds or thousands of SSPCs.

SSPCs also must operate in the presence of lightning, which can adversely impact electronic devices. Traditionally, aircraft had an aluminum skin that attenuated the lightning current induced on the wires. Some aircraft now use composite materials instead of aluminum for weight and strength benefits. However, composite materials do not provide the same level of attenuation to lightning as aluminum. When lightning occurs, hundreds of volts may surge between a load in the vehicle system and the aircraft chassis. As such, the lightning requirements of SSPCs have increased.

The increase in lightning levels poses a significant additional burden because the SSPC does not provide galvanic isolation in the off state, as would a typical electro-mechanical circuit for example. Instead, the SSPC uses the FET for switching and the electronic circuit to provide the circuit breaker function. If the SSPC is in an off state when lightning strikes, the large voltage potential will undesirably increase the voltage across the FET. An over-voltage clamp can be used to protect the FET from exceeding its maximum voltage capability by placing the FET into a linear region. However, the increased power dissipation of the FET in the linear region limits the amount of lightning energy that can be dissipated. Alternatively, high voltage FETs may be used to block the voltage in the off state, transient suppression devices can be placed across the FETs or more parallel FETs may be added, but these solutions are expensive, require larger packaging, and reduce reliability. Additionally, to protect the loads, a transient voltage suppression is often used by the load to shunt or divert the lightning current. This further increases the lightning energy that the SSPC must survive.

There is a need for a simple, relatively inexpensive SSPC with improved lightning protection. This invention addresses those needs while avoiding the shortcomings and drawbacks of the prior art.

SUMMARY OF THE INVENTION

An example method of controlling a solid state power controller includes selectively allowing a transient current through a solid state power control switch in response to the transient current exceeding at least one threshold.

An example solid state power controller system includes a switch having a closed state and an open state and a microcontroller that controls the switch. A module having an associated threshold also controls the switch and selectively allows a current through the switch in response to the current exceeding the threshold.

Another example method of controlling a solid state power controller includes turning a solid state power controller switch to an OFF state in response to a current through the switch exceeding a threshold, and automatically resetting the switch.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

FIG. 1 illustrates selected portions of an example solid state power controller with lightning protection.

DETAILED DESCRIPTION OF THE PREFERRED EMBODIMENT

FIG. 1 illustrates selected portions of an example solid state power controller (SSPC) 18 for use in a vehicle, such as an aircraft. Under some conditions, such as a lightning strike, a transient current may surge through the vehicle. The transient current may be, for example, an induced current, other known type of transient current, or a transient current from another source besides lightning. In the disclosed example, the SSPC 18 provides lightning protection to reduce the risk that the SSPC 18 becomes damaged from the transient current. As will be appreciated from the illustration and the following description, the SSPC 18 of the disclosed examples provides lightning protection without significant packaging density, reliability, or cost penalty. Although the SSPC 18 is a direct current type in the disclosed examples, one of ordinary skill in the art who has the benefit of this disclosure will recognize that the disclosed examples are also applicable to alternating current type SSPCs.

In this example, the SSPC 18 includes a logic section 32 and a power section 34. The logic section 32 includes a power supply 20, which provides power to a microcontroller 38 that controls operation of the SSPC 18. The microcontroller 38 interfaces with a gate drive 40, a switch 42, an instantaneous trip module 44, and a lightning module 46. Although only one switch 42 is shown in this example, multiple switches 42 may be used in the same manner as described. The instantaneous trip module 44 and lightning module 46 sense the electrical current flow through the SSPC 18.

In the disclosed example, the microcontroller 38 is in serial communication with a vehicle control 54. In this example, the vehicle control 54 includes an active microprocessor 56 and a standby microprocessor 58. The active microprocessor 56 communicates with the microcontroller 38 to control the operation of the SSPC 18. The standby microprocessor 58 communicates with the microcontroller 38 to establish or maintain a status of the SSPC 18. Each of the active microprocessor 56 and the standby microprocessor 58 send periodic signals to the microcontroller 38 to confirm that communication between the vehicle control 54 and the SSPC 18 has not been interrupted.

The instantaneous trip module 44 includes associated instantaneous trip logic and the lightning module 46 includes an associated lightning logic. The SSPC 18 responds in a variety of ways to a transient current, depending on the magnitude of the current flowing through the SSPC 18, a preset instantaneous trip threshold associated with the instantaneous trip module 44, a preset lightning threshold associated with the lightning module 46, and whether the SSPC 18 is an ON state (e.g., switch 42 is closed/ON) or an OFF state (e.g., switch 42 is open/OFF).

Currents larger than the instantaneous trip threshold are possible with loads that have transient voltage suppression (e.g., shunts) or loads that are highly capacitive in nature. In the disclosed example, the switch 42 includes a voltage clamp circuitry that protects the switch 42 in a known manner from certain voltage transients. The voltage clamp activates in a linear region to dissipate energy to thereby absorb transient currents up to the instantaneous trip threshold. Beyond the instantaneous trip threshold, the instantaneous trip module 44, the lightning module 46, and their associated logic protect the SSPC 18 from the transient current, as will be described below.

The following examples illustrate the operation of the instantaneous trip module 44 and the lightning module 46 under various conditions for transient currents. In the disclosed examples, turning ON the SSPC 18 passes the transient current to the load and thereby protects against formation of a fusible link and destruction of the switch 42. The below examples are intended only to illustrate concepts of the instantaneous trip module 44 and the lightning module 46, and one of ordinary skill who is given this description will recognize application of the concepts to other examples.

In one example, the SSPC 18 is OFF when the transient current occurs. Under this condition (i.e., SSPC 18 OFF), the only time that the current is expected to increase above the instantaneous trip threshold is if the SSPC 18 line $V_{line}$ or load output connection is shorted to a source voltage that exceeds the switch 42 over-voltage clamp protection, or if the SSPC 18 line $V_{line}$ or load connection is coupled to a transient voltage that exceeds the switch 42 over-voltage clamp protection. The switch 42 over-voltage clamp protects the switch 42 by turning on in a linear region to dissipate energy in a known manner. This provides the benefit of absorbing transient currents up to the instantaneous trip threshold. If, however, the transient current exceeds the instantaneous trip threshold, the instantaneous trip module, the lightning trip module and their associated logic function to protect the switch 42.

In the disclosed example, if the transient current increases above the instantaneous trip threshold, the instantaneous trip module 44 turns on the gate drive 40 to turn ON the switch 42. In this example, the switch 42 can handle more transient current when ON because the voltage across the switch 42 will be lower, which reduces the transient energy that switch 42 must absorb. The transient current flows to the load during this time to thereby protect the SSPC 18 from damage. As the transient current decreases below the instantaneous trip threshold, the instantaneous trip module 44 removes the gate drive 40 command to force the switch 42 OFF. Optionally, a time delay is used before turning off gate drive 40 to allow the SSPC 18 to cool.

The direct communication between the instantaneous trip module 44 and the gate drive 40 provides the benefit of allowing transient current protection even when the microcontroller 38 is in an inactive mode (e.g., a sleep mode). In a sleep mode for example, the microcontroller 38 software will not be awake to control the SSPC 18 to respond to a lightning threat. By directly linking the instantaneous trip module 44 and the gate drive 40, the instantaneous trip module 44 can directly control the gate drive 40 without the microcontroller 38 to quickly turn ON the switch 42.

In another example, the SSPC 18 is ON when the transient current occurs. The transient current increases the current through the switch 42 until the instantaneous trip threshold is exceeded. At this point, the microcontroller 38 begins to turn OFF the switch 42 and set an auto-recover function. The process of turning OFF the switch 42 takes some time, typically fractions of a second. During this time, the current may increase, decrease, or remain steady.

If the current increases, but not fast enough to exceed the lightning threshold before the switch turns OFF, the switch 42 is turned back ON upon exceeding the lightning threshold. If the current increases quickly enough to exceed the lightning threshold before the switch 42 turns OFF, the microcontroller 38 cancels the command to turn OFF the switch 42 such that the switch remains ON. In the ON state, the transient current passes to the load to thereby protect the SSPC 18 from damage.

If the transient current decreases or remains steady and does not reach the lightning threshold, the switch 42 turns OFF and the auto-recover logic functions to turn the SSPC 18 back ON after a time delay time to allow cooling.

After the switch 42 is turned back ON, if the current remains above the instantaneous trip threshold but below the lightning threshold, the switch 42 turns OFF and the auto-recover logic again functions to turn the SSPC 18 back ON after another time delay time to allow cooling. It is assumed that current above the instantaneous trip threshold is from a shorted load and not lightning if multiple attempts to auto-recover continue to produce current above the instantaneous trip threshold but below the lightning threshold. In response, a protective trip is set in the microprocessor 38, and the SSPC 18 turns OFF.

The auto-recover logic can also be used in SSPCs that do not include the lightning module 46. In such an embodiment, the instantaneous trip module 44 and its associated instantaneous trip threshold function to turn the SSPC 18 OFF if the current through the switch 42 exceeds the instantaneous trip threshold. The auto-recover logic turns the switch 42 back ON after a time delay time to allow cooling. If the current remains above the instantaneous trip threshold, the switch 42 turns OFF. The auto-recover logic again functions to turn the SSPC 18 back ON after another time delay time to allow cooling. If multiple attempts to auto-recover continue to produce current above the instantaneous trip threshold, a protective trip is set in the microprocessor 38, and the SSPC 18 turns OFF. The auto-recover logic provides the benefit of automatically resetting the switch 42 without the need for manual resetting (e.g., from an aircraft pilot), which is a drawback of prior SSPCs.

Thus, the disclosed examples provide for turning the SSPC 18 ON in response to the transient current exceeding the instantaneous trip threshold or lightning threshold, depending on the initial ON or OFF state of the SSPC 18. This provides the benefit of passing the transient current on to the load to protect the SSPC 18 from damage. Furthermore, the lightning module 46 requires little additional hardware in the SSPC 18, which helps keep costs and packaging density low.

Although a preferred embodiment of this invention has been disclosed, a worker of ordinary skill in this art would recognize that certain modifications would come within the scope of this invention. For that reason, the following claims should be studied to determine the true scope and content of this invention.

We claim:

1. A method of controlling a solid state power controller, comprising:

selectively allowing a current through a solid state power control switch in response to the current exceeding at least one threshold, wherein the current is allowed through the solid state power control switch to prevent the current from damaging the solid state power control switch.

2. The method as recited in claim 1, including maintaining the switch in an ON, closed state in response to the current exceeding the at least one threshold.

3. The method as recited in claim 1, wherein the at least one threshold includes a first threshold and a second threshold that is greater than the first threshold, and the switch comprises an ON, closed state and an OFF, open state.

4. The method as recited in claim 3, including maintaining the switch in the ON state in response to the current exceeding the first threshold.

5. The method as recited in claim 3, including providing an over-voltage clamp on the switch to dissipate the transient energy when the switch is in the OFF state.

* * * * *

UNITED STATES PATENT AND TRADEMARK OFFICE
CERTIFICATE OF CORRECTION

PATENT NO.       : 7,626,797 B2                          Page 1 of 1
APPLICATION NO. : 11/491803
DATED            : December 1, 2009
INVENTOR(S)      : Kilroy et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 353 days.

Signed and Sealed this

Twenty-first Day of December, 2010

David J. Kappos
*Director of the United States Patent and Trademark Office*